United States Patent [19]
Mahalingaiah et al.

[11] Patent Number: 6,085,302
[45] Date of Patent: Jul. 4, 2000

[54] MICROPROCESSOR HAVING ADDRESS GENERATION UNITS FOR EFFICIENT GENERATION OF MEMORY OPERATION ADDRESSES

[75] Inventors: Rupaka Mahalingaiah; Thang M. Tran, both of Austin, Tex.

[73] Assignee: Advanced Micro Devices, Inc., Sunnyvale, Calif.

[21] Appl. No.: 08/633,351

[22] Filed: Apr. 17, 1996

[51] Int. Cl.⁷ .................................................... G06F 12/02

[52] U.S. Cl. .......................... 711/220; 711/117; 711/118; 711/119

[58] Field of Search .................................. 395/412, 413, 395/414, 418, 419, 421.04, 421.05, 421.1, 381, 490, 800, 570, 567; 711/1, 2, 202, 203, 215, 219, 220, 167, 168, 169

[56] References Cited

U.S. PATENT DOCUMENTS

| | | | |
|---|---|---|---|
| 4,044,338 | 8/1977 | Wolf ............................................ | 365/49 |
| 4,373,182 | 2/1983 | Schultz et al. .......................... | 711/215 |
| 4,409,654 | 10/1983 | Wada et al. .............................. | 711/213 |
| 4,453,212 | 6/1984 | Gaither et al. .............................. | 711/2 |
| 4,807,115 | 2/1989 | Torng ...................................... | 395/391 |
| 4,858,105 | 8/1989 | Kuriyama et al. ...................... | 395/582 |
| 5,185,871 | 2/1993 | Frey et al. .............................. | 395/381 |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Johnson, Mike "Superscalar Microprocessor Design" Prentice Hall Englewood Cliffs, NJ 07632 1991, pp. 19–21.

Intel 1994 Pentium Processor Family User's Manual, vol. 1: Pentium Processor Family Data Book, pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman , "P6: The Next Step?," PC Magazine, Sep. 12, 1995, 16 pages.

Tom R. Halfhill, "AMD K6 Takes On Intel P6," BYTE, Jan. 1996, 4 pages.

*Primary Examiner*—Do Hyun Yoo
*Assistant Examiner*—Than V. Nguyen
*Attorney, Agent, or Firm*—Conley, Rose & Tayon, P.C.; Christopher P. Kosh; Lawrence J. Merkel

[57] ABSTRACT

A microprocessor including address generation units configured to perform address generation for memory operations is provided. A reservation station associated with one of the address generation units receives the displacement from an instruction and an indication of the selected segment register upon decode of the instruction in a corresponding decode unit within the microprocessor. The displacement and segment base address from the selected segment register are added in the reservation station while the register operands for the instruction are requested. If the register operands are provided upon request (as opposed to a reorder buffer tag), the displacement/base sum and register operands are passed to the address generation unit. The address generation unit adds the displacement/base sum to the register operands, thereby forming the linear address. If register operands are not provided upon request (i.e. one or more reorder buffer tags are received instead of the corresponding register operand), then the reservation station stores the displacement/base sum and register operands/tags. Once each register operand has been provided, the displacement/base sum and register operands are conveyed to the address generation unit. Data address generation responsibilities are thereby fulfilled by the address generation units. Since the functional units of the microprocessor are relieved of address generation responsibilities, the functional units may be simplified.

23 Claims, 9 Drawing Sheets

U.S. PATENT DOCUMENTS

| | | | |
|---|---|---|---|
| 5,204,953 | 4/1993 | Dixit | 711/220 |
| 5,226,126 | 7/1993 | McFarland et al. | 395/394 |
| 5,226,130 | 7/1993 | Favor et al. | 395/585 |
| 5,233,553 | 8/1993 | Shak et al. | 708/491 |
| 5,274,776 | 12/1993 | Senta | 395/570 |
| 5,345,569 | 9/1994 | Tran | 395/393 |
| 5,408,626 | 4/1995 | Dixit | 711/220 |
| 5,423,013 | 6/1995 | Baum et al. | 711/163 |
| 5,434,987 | 7/1995 | Abramson | 395/567 |
| 5,511,017 | 4/1996 | Cohen et al. | 708/491 |
| 5,517,657 | 5/1996 | Rodgers et al. | 711/169 |
| 5,519,841 | 5/1996 | Sager et al. | 711/202 |
| 5,524,263 | 6/1996 | Griffth et al. | 395/800.23 |
| 5,546,593 | 8/1996 | Kimura et al. | 395/569 |
| 5,559,975 | 9/1996 | Christie et al. | 395/571 |
| 5,568,630 | 10/1996 | Killian et al. | 395/376 |
| 5,590,297 | 12/1996 | Huck et al. | 711/1 |
| 5,590,352 | 12/1996 | Zuraski, Jr. et al. | 395/800.23 |
| 5,612,911 | 3/1997 | Timko | 708/670 |
| 5,615,350 | 3/1997 | Heeson et al. | 395/394 |
| 5,655,139 | 8/1997 | Thomson et al. | 395/800.32 |
| 5,664,137 | 9/1997 | Abramson et al. | 711/144 |

MICROPROCESSOR HAVING ADDRESS GENERATION UNITS FOR EFFICIENT GENERATION OF MEMORY OPERATION ADDRESSES

BACKGROUND OF THE INVENTION

1. Field of the Invention

This invention relates to the field of microprocessors and, more particularly, to address generation mechanisms within microprocessors.

2. Description of the Relevant Art

Superscalar microprocessors achieve high performance by simultaneously executing multiple instructions during a clock cycle and by specifying the shortest possible clock cycle consistent with the design. As used herein, the term "clock cycle" refers to an interval of time during which the pipeline stages of a microprocessor perform their intended functions. Storage devices (e.g. registers or arrays) capture their values in response to a clock signal defining the clock cycle. For example, storage devices may capture a value in response to a rising or falling edge of the clock signal.

Microprocessor designers often design their products in accordance with the x86 microprocessor architecture in order to take advantage of its widespread acceptance in the computer industry. Because the x86 microprocessor architecture is pervasive, many computer programs are written in accordance with the architecture. X86 compatible microprocessors may execute these computer programs, thereby becoming more attractive to computer system designers who desire x86-capable computer systems. Such computer systems are often well received within the industry due to the wide range of available computer programs.

The x86 microprocessor architecture includes an address translation mechanism. Address translation involves the mapping of an address created by the microprocessor to an address actually used to access memory. Generally speaking, an address is a value which uniquely identifies a byte within memory. One or more bytes contiguous to the identified byte may be accessed by presenting to the memory both an address and a number of bytes to access.

Address translation mechanisms are employed for many reasons. For example, the address translation mechanism may be used to define certain microprocessor-created addresses as not presently stored within the main memory. Data corresponding to addresses which are not stored within main memory may be stored on a disk drive within the computer system. When such an address is accessed, the corresponding data may be swapped with data currently stored in main memory. The address translation for the data swapped onto the disk drive is invalidated and an address translation is defined for the data swapped into memory. In this manner, the computer program may access an address space larger than the main memory can support. Additionally, address translation mechanisms are used to protect the data used by one program from access and modification by another program executing within the same computer system. Different areas of main memory are allocated to each program, and the translations for each program are constrained such that any address created by one program does not translate to a memory location allocated to another program. Many other reasons for employing address translation mechanisms are well known.

The x86 address translation mechanism includes two levels. A first level, referred to as segmentation, takes a logical address generated according to instruction operands and produces a linear address. The second level, referred to as paging, translates the linear address to a physical address (i.e. the address actually used to access memory). The linear address is equal to the physical address in cases where the paging mechanism is disabled.

For a particular data access to memory, the logical address comprises the result of adding certain operands defined by the instruction. As used herein, the term "operand" refers to an input value operated upon by an instruction. Operands are referred to as register operands if the value is stored in a register within the microprocessor. Conversely, operands are referred to as memory operands if the value is stored in a memory location. The memory location is identified by forming a data address. In the x86 microprocessor architecture, an instruction may form the logical data address of a memory operand using up to two register operands and up to one displacement. The displacement is a value encoded into a particular field of the instruction, and is intended for use in forming the logical data address. The register values used to form the logical data address are also referred to herein as register operands.

Upon generating the logical address, the linear address may be generated. A set of segment registers and associated "shadow registers" store segmentation translation information. The segment selectors are accessible via instructions, while the shadow registers are accessible only to microprocessor hardware. As used herein, the term "segment registers" will be used to refer to the segment registers and associated shadow registers. Each instruction accesses a particular segment register by default when forming linear addresses. Additionally, an instruction may specify a segment register other than the default via an instruction prefix defined in the x86 microprocessor architecture.

Generally speaking, segmentation translation information includes a segment base address, a segment limit, and segment access information. The segment base address is the linear address defined for a logical address having the arithmetic value of zero. Linear addresses within the segment have an arithmetic value which is greater than or equal to the segment base address. The segment limit defines the largest logical address which is within the segment. Logical addresses larger than the segment limit result in an exception being generated by the microprocessor. The segment access information indicates if the segment is present in memory, the type of segment (i.e. instruction code or data, and various subtypes), the addressing mode of the segment, etc. The linear address corresponding to a particular logical address is the result of adding the segment base address to the logical address. Additional information regarding the x86 address translation mechanism may be found in the publication: "PC Magazine Programmer's Technical Reference: The Processor and Coprocessor" by Hummel, Ziff-Davis Press, Emeryville, Calif., 1992 (pp 85–105). This publication is incorporated herein by reference in its entirety.

As used herein, the term "exception" refers to an interruption in the execution of an instruction code sequence. The exception is typically reported to a centralized handling mechanism which determines an appropriate response to the exception. Some exceptions (such as branch misprediction, for example) may be handled by the microprocessor hardware. The hardware performs corrective actions and then restarts instruction execution. Other exceptions may cause a microcode routine within the microprocessor to be executed. The microcode routine corrects the problem corresponding to the exception. Instruction execution may subsequently be restarted at the instruction causing the exception or at another instruction subsequent to the instruction, dependent upon the corrective actions taken. A third type of exception causes execution of special instruction code stored at an address defined for the exception. The special instruction code determines the reason for the exception and any corrective actions. The third type of exception is architecturally defined, such that software may be written to handle the exception. Upon execution of a particular instruction (a return instruction), instruction execution is typically restarted at the instruction which causes the exception. Segment limit violations are an example of the third type of exception. Selection of which method to handle a particular exception with in a microprocessor is dependent upon the relative frequency at which the exception occurs, and the associated performance impact of handling the exception in the various different manners.

Unfortunately, the generation of a logical address involving up to three operands followed by generation of a linear address from the logical address leads to significant latency in data accesses. Because the logical address may depend upon registers, it is typically not generated until the associated instruction arrives in a functional unit. Generating the logical address typically requires one to two clock cycles (depending upon the number of operands), followed by a linear address generation requiring yet another clock cycle. Delays in address generation result in delays in receiving the accessed data. Instructions dependent upon the accessed data are thereby delayed from executing as well. For a microprocessor configured to generate a linear address in a single clock cycle, a four input adder is needed to handle two register operands, a displacement, and a segment base address. The four input adder may deleteriously affect clock cycle time of the microprocessor.

SUMMARY OF THE INVENTION

The problems outlined above are in large part solved by a microprocessor in accordance with the present invention. The microprocessor includes address generation units configured to perform address generation for memory operations. A reservation station associated with one of the address generation units receives the displacement from an instruction and an indication of the selected segment register upon decode of the instruction in a corresponding decode unit within the microprocessor. The displacement and segment base address from the selected segment register are added in the reservation station while the register operands for the instruction are requested. If the register operands are provided upon request (as opposed to a reorder buffer tag), the displacement/base sum and register operands are passed to the address generation unit. The address generation unit adds the displacement/base sum to the register operands, thereby forming the linear address. Advantageously, linear address generation is completed prior to the corresponding instruction reaching the execute stage of the instruction processing pipeline. Linear and logical address generation are combined, eliminating an extra clock cycle of addition as compared to certain previous designs. Performance of the microprocessor may be increased by decreasing address generation latency and therefore data access latency.

If register operands are not provided upon request (i.e. one or more reorder buffer tags are received instead of the corresponding register operand), then the reservation station stores the displacement/base sum and register operands/tags. Once each register operand has been provided, the displacement/base sum and register operands are conveyed to the address generation unit. Advantageously, data address generation responsibilities are fulfilled by the address generation units. Since the functional units of the microprocessor (which execute other instruction operations) are relieved of address generation responsibilities, the functional units may be simplified. For example, a two input adder circuit may be sufficient for the functional units. The complex address generation operation is fully performed by the address generation units and hence the more complex adder circuits are included in the address generation units instead of the functional units.

Broadly speaking, the present invention contemplates a microprocessor comprising a plurality of segment registers, a first circuit, and a second circuit. The plurality of segment registers are configured to store a plurality of segment base addresses. Coupled to the plurality of segment registers, the first circuit is configured to generate a first sum comprising a displacement corresponding to an instruction and one of the plurality of segment base addresses. The selected segment base address corresponds to one of the plurality of segment registers, wherein the one of the plurality of segment registers is selected in response to the instruction. The second circuit is coupled to receive the first sum from the first circuit, and is configured to generate a second sum by adding the first sum to a register operand identified by the instruction. The second sum comprises a linear address corresponding to an operand of the instruction.

The present invention further contemplates a superscalar microprocessor comprising a plurality of segment registers, a plurality of decode units, a first plurality of reservation stations, a plurality of address generation units, and a load/store unit. The plurality of segment registers are configured to store a plurality of segment base addresses. The plurality of decode units are configured to concurrently decode a plurality of instructions. Each of the plurality of decode units is configured to detect a displacement within a respective one of the plurality of instructions, and is further configured to determine which one of the plurality of segment registers comprises a selected segment register identified by the respective one of the plurality of instructions. Each one of the first plurality of reservation stations is coupled to a respective one of the plurality of decode units and to the plurality of segment registers. The first plurality of reservation stations are each configured to generate a first sum comprising the displacement and one of the plurality of segment base addresses (stored in the selected segment register). Each one of the plurality of address generation units is coupled to a respective one of the first plurality of reservation stations. The plurality of address generation units are each configured to generate a linear address comprising a second sum of the first sum and at least one register operand identified by the respective one of the plurality of instructions. The load/store unit is coupled to the plurality of address generation units, and is configured to perform a memory operation upon receipt of the linear address from the plurality of address generation units.

BRIEF DESCRIPTION OF THE DRAWINGS

Other objects and advantages of the invention will become apparent upon reading the following detailed description and upon reference to the accompanying drawings in which:

FIG. 3 highlights interconnections between the units according to one embodiment of the microprocessor.

Figure 1:
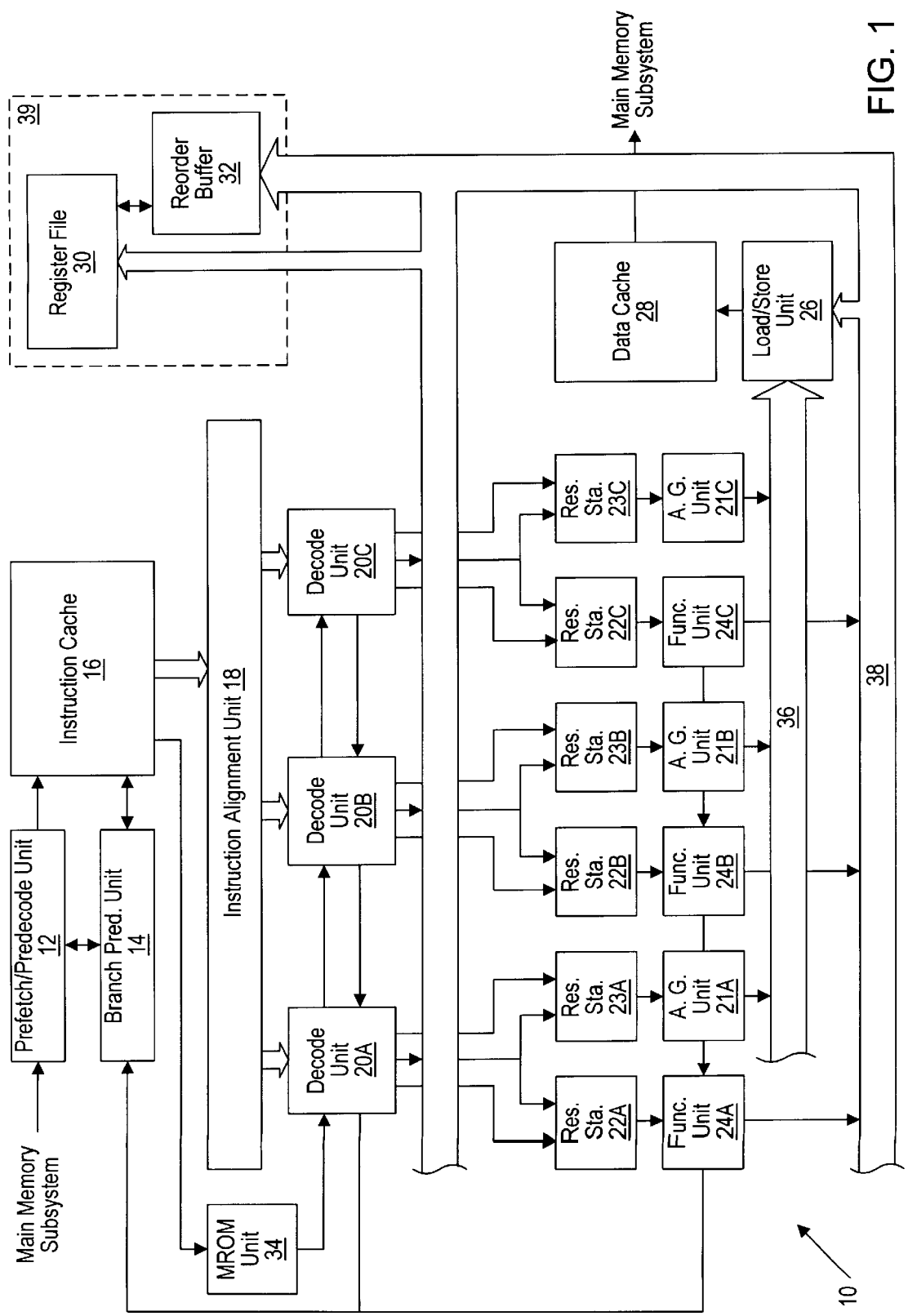
FIG. 1 is a block diagram of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of address generation units 21A–21C, a first plurality of reservation stations 23A–23C, a second plurality of reservation stations 22A–22C, a plurality of functional units 24A–24C, a load/store unit 26, a data cache 28, a register file 30, a reorder buffer 32, and an MROM unit 34. Blocks referred to herein with a reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26, to a respective first reservation station 23A–23C and a respective second reservation station 22A–22C. Second reservation stations 22A–22C are further coupled to respective functional units 24A–24C. Additionally, decode units 20, first reservation stations 23, and second reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Address generation units 21 are coupled to respective first reservation stations 23 and to load/store unit 26 via a plurality of address buses 36. Finally, MROM unit 34 is coupled to decode units 20.

Generally speaking, microprocessor 10 employs address generation units 21 and first reservation stations 23 to generate data addresses for memory operations corresponding to instructions being executed. A decode unit 20A–20C provides the displacement and an indication of the selected segment corresponding to an instruction to a first reservation station 23A–23C. The first reservation station 23A–23C forms the sum of the displacement and segment base address corresponding to the selected segment register. If the register operands used to form the data address are conveyed from register operand storage 39 upon request by the decode unit 20A–20C, the first reservation station 23A–23C provides the displacement/base sum and the register operands to the corresponding address generation unit 21A–21C. If the register operands used to form the data address are not conveyed from register operand storage 39 (i.e. reorder buffer tags are conveyed instead), then first reservation station 23A–23C stores the displacement/base sum and the register operands/reorder buffer tags until the register operands used to form the data address are provided. Upon receipt of the remaining register operands, first reservation station 23A–23C conveys the operands and displacement/base sum to address generation unit 21A–21C. Advantageously, address generation is performed by first reservation stations 23A–23C and address generation units 21A–21C. Address generation may begin while the instruction is being decoded (e.g. adding the displacement to the segment base address), thereby decreasing the data access latency for the operation as compared to address generation mechanisms which begin at instruction execution. Still further, functional units 24 need not contain circuitry for performing address generation. Functional unit complexity may thereby be reduced.

Additionally, address generation units 21 are configured to "hide" the linear address generation portion of data address generation within the logical address generation mechanism. Effectively, the logical and linear address calculations are merged. First reservation stations 23 receive the segment base addresses corresponding to each segment register from load/store unit 26. First reservation stations 23 select one of the segment base addresses dependent upon the default segment register corresponding to the instruction being decoded, as well as dependent upon any overriding specification via a prefix byte within the instruction. First reservation stations 23 add the selected segment base address to the displacement coded into the instruction. If no displacement is included, a displacement value of zero is used. The sum is subsequently added to any register operands (according to the instruction encoding). The linear address is thereby successfully created. Advantageously, the clock cycle previously devoted to generating the linear address from the logical address is eliminated. Instead, the segment base address is added into the address operands while the corresponding instruction is decoded.

Since linear address generation latency is decreased, overall data access time may be decreased for load memory operations. In one particular embodiment, linear address generation is decreased from 2–3 clock cycles of address calculation in functional units 24 and load/store unit 26 (dependent upon the number of logical address operands) to 1–2 clock cycles of address calculation within address generation units 21 and first reservation stations 23. In addition, the address generation is started at an earlier clock cycle than if functional units 24 perform the address generation. It is noted that, in the absence of the presently described apparatus, load/store unit 26 typically performs the logical to linear address calculation upon receipt of the logical address from one of functional units 24. Microprocessor 10 may enjoy increased performance due to the decreased latency of linear address generation.

In one embodiment, microprocessor 10 generates 32 bit linear addresses. Additionally, segment base addresses are 32 bits. However, for compatibility with previous versions of x86 microprocessors, logical addresses may be 16 bit or 32 bit values. A bit within the segment access information for the code segment (i.e. the segment represented by the CS segment register) indicates whether logical addresses are 16 bit or 32 bit values. Additionally, instructions may override the bit with a prefix byte (similar to overriding the default segment register).

When 16 bit logical addresses are used, another problem is incurred. The displacement and any register operands are added together and the result truncated to 16 bits to form the logical address (i.e. prior to adding the result to the segment base address). By adding the segment base address (comprising 32 bits) to the displacement and subsequently adding the generated 32 bit sum to any register operands, the truncation to 16 bits is lost. Address generation units 21 and first reservation stations 23 may be configured to detect an arithmetic carry between the least significant 16 bits and the most significant 16 bits during each addition performed to generate a data address. If the logical data address is 16 bits and a carry is detected, microprocessor 10 may generate an exception for the associated instruction and perform the associated instruction through MROM unit 34.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 16 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

| | |
|---|---|
| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to second reservation stations 22 along with operand address information and immediate data which may be included with the instruction. The set of control values generated by decode units 20 in response to a particular instruction comprise the "decoded instruction" corresponding to the particular instruction. Decode units 20 route displacement data from the instruction to the respective first reservation station 23, along with an indication of the selected segment register corresponding to the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction which involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate data provided at the outputs of decode units 20 are routed directly to respective second reservation stations 22. In one embodiment, each second reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each second reservation station 22 is associated with a dedicated functional unit 24. Accordingly, three dedicated "issue positions" are formed by second reservation stations 22 and functional units 24. In other words, issue position 0 is formed by second reservation station 22A and functional unit 24A. Instructions aligned and dispatched to second reservation station 22A are executed by functional unit 24A. Similarly, issue position 1 is formed by second reservation station 22B and functional unit 24B; and issue position 2 is formed by second reservation station 22C and functional unit 24C.

Upon decode of a particular instruction, if a required operand is a register location, register address information is routed to reorder buffer 32 and register file 30 simultaneously. Reorder buffer 32 and register file 30 are searched for the corresponding register operands. Reorder buffer 32 and register file 30 may be classified as a "register operand storage", indicated by dashed enclosure 39. Register operands are requested from the register operand storage, and the register operands or a reorder buffer tag identifying the register operand for retrieval from result buses 38 are conveyed from the register operand storage. Although shown as register file 30 and reorder buffer 32 in the present embodiment, register operand storage 39 may comprise any storage from which register operands are provided. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding second reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, second reservation stations 22 store instructions until the instructions are executed by the corresponding functional unit 24. An instruction is selected for execution if: (i) the operands of the instruction have been provided; and (ii) the operands have not yet been provided for instructions which are within the same second reservation station 22A–22C and which are prior to the instruction in program order. It is noted that when an instruction is executed by one of the functional units 24, the result of that instruction is passed directly to any second reservation stations 22 and first reservation stations 23 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Second reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated similar to load/store unit 26 in that any of decode units 20 may dispatch instructions to the floating point unit.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 (one for each functional unit 24 and two for load/store unit 26) are included for conveying such results to various destinations. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 subsequently receives the data address of the memory operation from address generation units 21. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. A load memory operation is a transfer of data from memory to microprocessor 10. A store memory operation is a transfer of data from microprocessor 10 to memory. Either memory operation may be completed via an access to data cache 28. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the segment base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Although the above description discusses adding two register operands, a displacement, and a segment base address to form a linear address, other values may be included in linear address generation as well. In particular, if microprocessor 10 employs the x86 microprocessor architecture, microprocessor 10 may be configured to generate a constant value indicative of modification of the ESP or EBP register. These registers are often incremented or decremented by a constant value in response to execution of instructions. For example, the POP instruction in 32 bit addressing mode increments the ESP by 4. Similarly, the PUSH instruction decrements the ESP by 4 in 32 bit mode. Instruction alignment unit 18 may be configured to generate a constant for a particular instruction indicative of modification of the ESP or EBP value by those instructions to be concurrently decoded with the particular instruction by microprocessor 10. The constant indicates modification of the ESP or EBP by concurrently decoded instructions which are prior to the particular instruction in program order. Reorder buffer 32 provides a reorder buffer tag indicative of the ESP and EBP value prior to execution of the concurrently decoded instructions. When the ESP or EBP value prior to execution of the concurrently decoded instructions is generated, each of the concurrently decoded instructions which requires the ESP or EBP captures the value and adds the constant to the value to generate the appropriate register operand for use by the instruction. The apparatus described herein may be configured to accept the constant as an additional operand. Additional information may be found in the commonly assigned, co-pending patent application entitled "A Reorder Buffer Including a Speculative Register File Configured to Store Line-Oriented Speculative Register States", Ser. No. 08/550,218, filed Oct. 30, 1995 by Tran, et al. and "A Speculative Register File for Storing Speculative Register States and Removing Dependencies Between Instructions Utilizing the Register", Ser. No. 08/549,961, filed Oct. 30, 1995 by Tran, et al. The referenced patent applications are incorporated herein by reference in their entirety.

It is noted that, although an equal number of address generation units 21 and functional units 24 are shown in FIG. 1, other embodiments of microprocessor 10 may include unequal numbers of address generation units 21 and functional units 24. For example, an embodiment of microprocessor 10 may include a single address generation unit 21. The address generation unit 21 would receive information regarding address generation for memory operations from each decode unit 20. As another example, an address generation unit 21 may be included for every two functional units 24. Each address generation unit 21 would then be responsible for address generation for instructions executed by the corresponding two functional units. Still further, address generation units may be included which are not specifically associated with any functional units. Instead, the address generation units receive address generation requests from any decode unit, based upon available resources.

Figure 2:
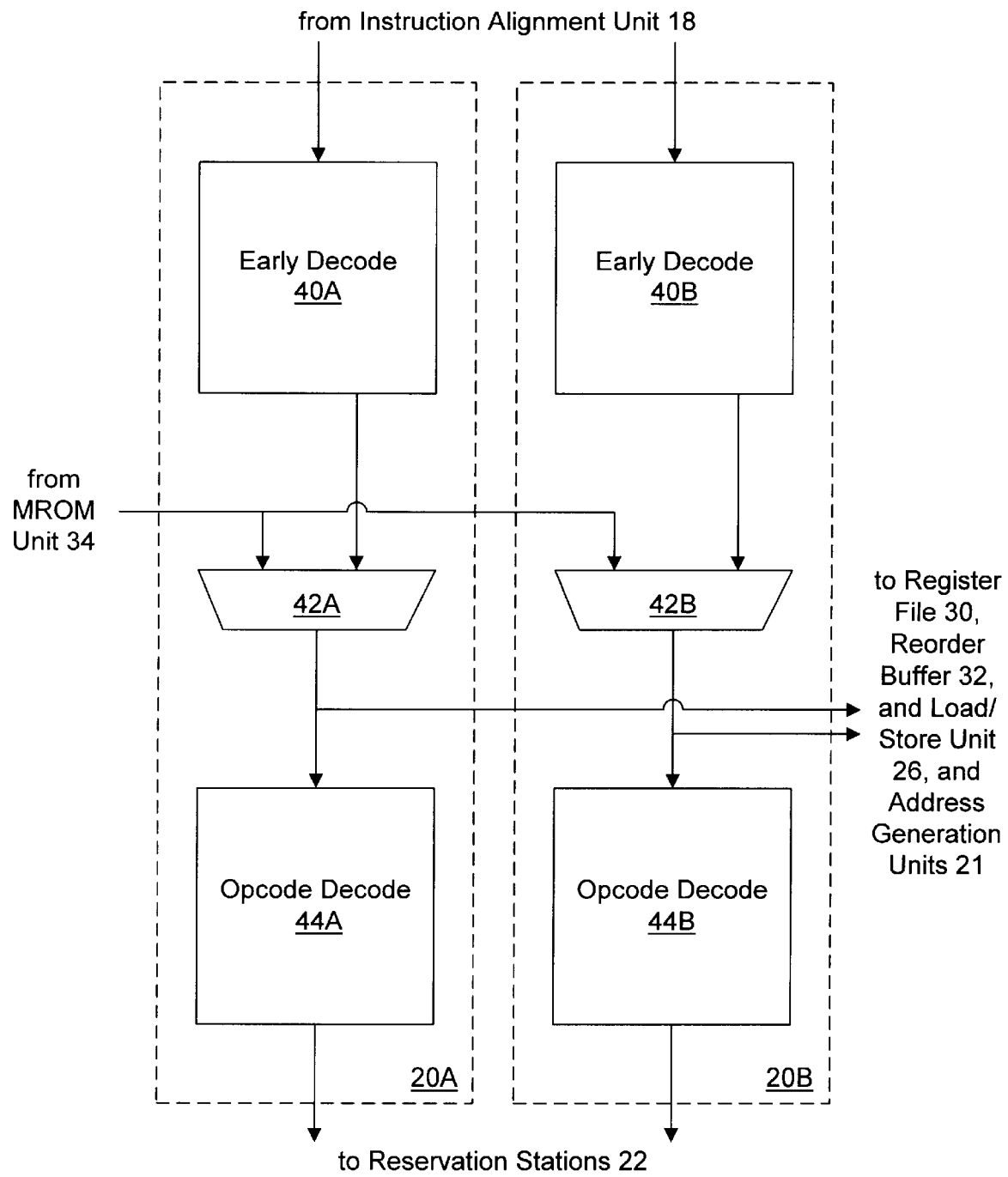
FIG. 2 is a block diagram of one embodiment of a pair of decode units shown in FIG. 1.

Turning now to FIG. 2, a block diagram of one embodiment of decode units 20A and 20B are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20A comprises early decode unit 40A, multiplexor 42A, and opcode decode unit 44A. Similarly, decode unit 20B includes early decode unit 40B, multiplexor 42B, and opcode decode unit 44B.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective second reservation stations 22. Each of opcode decode units 44A–44C forms an issue position with the corresponding second reservation station 22A–22C and functional unit 24A–24C. Instructions are passed from an opcode decode unit 44 to the corresponding second reservation station 22 and further to the corresponding functional unit 24.

Multiplexor 42A is included for selecting between the instructions provided by MROM unit 34 and by early decode unit 40A. During times in which MROM unit 34 is dispatching instructions, multiplexor 42A selects instructions provided by MROM unit 34. At other times, multiplexor 42A selects instructions provided by early decode unit 40A. Similarly, multiplexor 42B selects between instructions provided by MROM unit 34 and early decode unit 40B.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the corresponding opcode decode unit and address generation unit.

Opcode decode units 44 are configured to decode the opcode of the instruction, producing control values for functional unit 24. Immediate data is routed with the control values to reservation stations 22. Displacement data is routed to address generation units 21 for use in generating a data address. Additionally, the selected segment register corresponding to the instruction is routed to address generation units 21.

Since early decode units 40 detect operands, the outputs of multiplexors 42 are routed to register file 30 and reorder buffer 32. Operand values or tags may thereby be routed to first reservation stations 23 and second reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
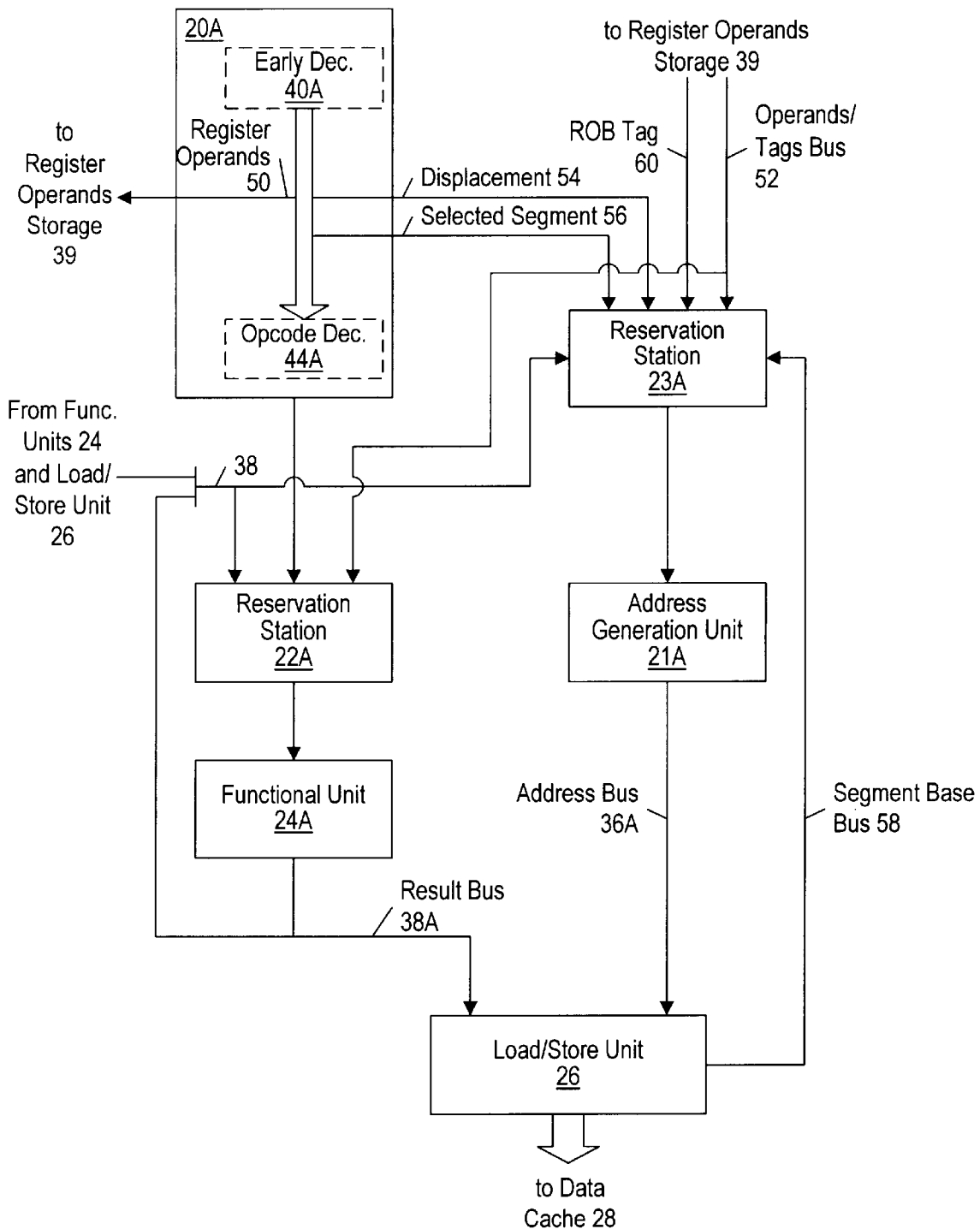
FIG. 3 is a block diagram of a decode unit, a first reservation station, a second reservation station, a functional unit, an address generation unit, and a load/store unit shown in FIG. 1.

Turning next to FIG. 3, a block diagram of decode unit 20A, first reservation station 23A, address generation unit 21A, second reservation station 22A, functional unit 24A, and load/store unit 26 is shown. Interconnections between the blocks according to one embodiment of microprocessor 10 are highlighted in FIG. 3. Interconnections between decode units 20B–20C, first reservation stations 23B–23C, address generation units 21B–21C, reservation stations 22B–22C, functional units 24B–24C, and load/store unit 26 may be similar. Additional interconnections may be included between the blocks for other purposes.

Early decode unit 40A selects the register operands and displacement from the instruction conveyed thereto by instruction alignment unit 18. The register operands are requested from register operand storage 39 (comprising reorder buffer 32 and register file 30) by conveying indications of the registers upon a register operand bus 50. Corresponding register operands (or reorder buffer tags to be captured from result buses 38) are conveyed upon operands/tags bus 52. Both first reservation station 23A and second reservation station 22A receive operands/tags bus 52 in order to capture the operands for the instruction. When register operands, if any, are provided for each operand used to form the data address, address generation unit 21A forms the data address and conveys the data address to load/store unit 26 upon address bus 36A. Address bus 36A is one of address buses 36 shown in FIG. 1.

In order to form the data address, first reservation station 23A receives the displacement corresponding to the instruction from early decode unit 40A within decode unit 20A. If the instruction does not include a displacement, a zero displacement value is conveyed by decode unit 20A. A displacement bus 54 is included for this purpose. Additionally, the reorder buffer tag corresponding to the instruction is conveyed upon address bus 36A such that load/store unit 26 may identify the memory operation with which to associate the data address. An ROB tag bus 60 from reorder buffer 32 conveys the tag assigned to the instruction to first reservation station 23A. The tag may arrive at first reservation station 23A concurrently with the displacement and selected segment information.

In one embodiment, the data address formed by address generation unit 21A is the linear data address including the segment base address from the segment register selected by the instruction. The selected segment register is identified by early decode unit 40A, and an indication of the selected segment is conveyed upon selected segment bus 56 to first reservation station 23A. First reservation station 23A uses the selected segment indication to select one of the segment base addresses provided by load/store unit 26 upon segment base bus 58. A segment base address is provided upon segment base bus 58 corresponding to each segment register employed by microprocessor 10. In embodiments of microprocessor 10 employing the x86 microprocessor architecture, six segment base addresses are conveyed corresponding to the six x86 segment registers (i.e. CS, SS, DS, ES, FS, and GS). It is noted that first reservation stations 23 may maintain duplicate copies of the segment registers instead of receiving the segment base addresses from load/store unit 26.

Second reservation station 22A receives register operands or reorder buffer tags associated with the instruction upon operands/tag bus 52. Additionally, the decoded instruction including immediate and displacement data is conveyed from decode unit 20A. Second reservation station 22A stores the instruction and operands until each operand has been provided. Result buses 38 (including result bus 38A from functional unit 24A) are coupled to first reservation station 23A and second reservation station 22A. The reservation stations scan the results provided upon result buses 38 by functional units 24 and load/store unit 26 for reorder buffer tags stored with respect to the instruction. When a result corresponding to the instruction is conveyed, either or both reservation stations 22A and 23A capture the result. First reservation stations 23A stores and captures operands used to form the data address, while second reservation station 22A stores and captures operands used by the instruction itself. Address-forming operands may be requested upon register operands bus 50 and received upon operands/tags bus 52 upon dedicated lines, while other dedicate lines provide operands used by the instruction itself. Alternatively, decode unit 20A may communicate which of the operands are for address generation and which are for the instruction operation. Reservation stations 22A and 23A capture operands accordingly. The remaining operands used by the instruction are thereby provided. Upon receipt of the operands corresponding to the instruction, second reservation station 22A may select the instruction for execution by functional unit 24A.

When receiving an instruction which performs a store memory operation, functional unit 24A calculates the result of the instruction and forwards the result to load/store unit 26 upon result bus 38A. Load/store unit 26 stores the result with the corresponding store memory operation. When functional unit 24A receives an instruction which does not perform a store memory operation, the result is forwarded to register operand storage 39 upon result bus 38A.

It is noted that the x86 segmentation mechanism includes a segment limit defining the maximum logical address allowable within the selected segment. Since load/store unit 26 receives a linear address with the segment base address already added from address generation unit 21A, load/store unit 26 performs linear limit checking upon the received address. In other words, the segment limit is added to the segment base address to perform limit checking upon the linear address. Data cache access may be performed by load/store unit 26 upon receipt of the data address (and the result if the memory operation is a store memory operation).

Figure 4:
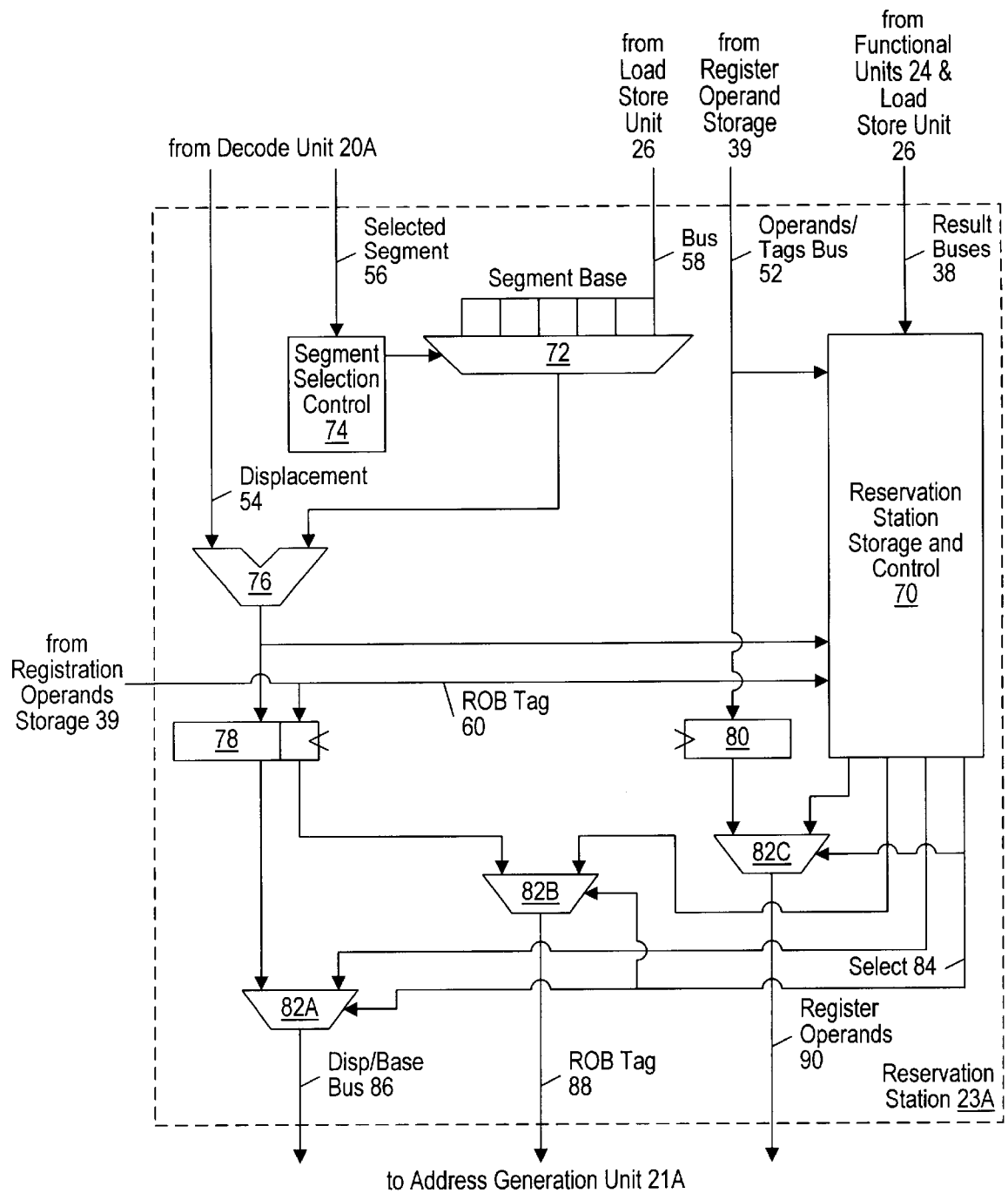
FIG. 4 is a logic diagram of one embodiment of the first reservation station shown in FIG. 3.

Turning now to FIG. 4, a block diagram of one embodiment of first reservation station 23A is shown. Reservation station 23A includes a reservation station storage and control unit 70, a segment selection circuit 72, a segment selection control unit 74, an adder circuit 76, a first storage circuit 78, a second storage circuit 80, and a plurality of output selection circuits 82A–82C. Reservation station storage and control unit 70 is coupled to operands/tags bus 52, result buses 38, adder circuit 76, ROB tag bus 60, and output selection circuits 82. Segment selection circuit 72 is coupled to segment base bus 58, adder circuit 76, and segment selection control unit 74. Segment selection control unit 74 is further coupled to selected segment bus 56. Adder circuit 76 is coupled to displacement bus 54 and first storage circuit 78. First storage circuit 78 is additionally coupled to output selection circuits 82A and 82B. Similarly, second storage circuit 80 is coupled to output selection circuit 82C. Furthermore, second storage circuit 80 receives operands/tags bus 52 from register operand storage 39. Output selection circuits 82A, 82B, and 82C receive a selection control line 84 from reservation station and control unit 70, and are respectively coupled to a displacement/base bus 86, a second ROB tag bus 88, and a register operands bus 90.

Reservation station storage and control unit 70 is configured to store address generation information corresponding to a plurality of instructions until the corresponding data addresses may be generated. Address generation information includes register operands used to form the data address, reorder buffer tags corresponding to the register operands, a reorder buffer tag identifying the corresponding instruction, and a displacement/base sum. Reservation station storage and control unit 70 receives the reorder buffer tag upon ROB tag bus 60 from reorder buffer 32. The displacement/base sum is received from adder circuit 78, generated from the displacement and selected segment values produced by decode unit 20A. Initially, register operands or reorder buffer tags are received upon operands/tags bus 52. For each reorder buffer tag provided in lieu of an operand value, a result is conveyed upon result buses 38 during a clock cycle subsequent to receipt of values upon operands/tags bus 52. Reservation station storage and control unit 70 monitors result buses 38 for reorder buffer tags stored therein. When a match is detected, the corresponding result is captured from result buses 38.

Upon receipt of each of the register operands used to form a particular data address, reservation station storage and control unit 70 may select the corresponding address generation information for conveyance to address generation unit 21A. Reservation station storage and control unit 70 transmits the address generation information to output selection circuits 82, and asserts select line 84 such that the information is selected through selection circuits 82 onto displacement/base bus 86, second ROB tag bus 88, and register operands bus 90. Reservation station storage and control unit 70 may employ the following selection criteria for selecting stored address generation information for conveyance to address generation unit 21A: (i) the operands used to form the corresponding data address have been provided; and (ii) the operands have not yet been provided for data addresses which are within reservation station storage and control unit 70 and which correspond to instructions which are prior to the instruction corresponding to the data address in program order. The address generation information is thereby conveyed to address generation unit 21A. Address generation unit 21A may generate the corresponding data address. The address generation information is discarded from reservation station storage and control unit 70 upon conveyance to address generation unit 21A.

If first reservation station 23A is not selecting stored address generation information for conveyance to address generation unit 21A, presently provided address generation information may be transmitted. If operands/tags bus 52 conveys register operands for each register operand used to form the data address (i.e. reorder buffer tags are not conveyed), then the address generation information may be directly conveyed to address generation unit 21A. A storage location within reservation station storage and control unit 70 need not be allocated for the address generation information. During clock cycles when the presently provided address generation information is to be transmitted, reservation station storage and control unit 70 deasserts the signal upon select line 84. The contents of storage circuits 78 and 80 are thereby selected through output selection circuits 82 onto displacement/base bus 86, second ROB tag bus 88, and register operands bus 90.

Adder circuit 76 produces the displacement/base sum. Displacement bus 54 is coupled to one of the inputs of adder circuit 76, conveying the displacement corresponding to the instruction being decoded by decode unit 20A. The other input to adder circuit 76 is coupled to segment selection circuit 72. Segment selection control unit 74 receives an indication of the selected segment upon selected segment bus 56 and asserts selection controls to segment selection circuit 72. Segment selection circuit 72 conveys one of the segment base addresses conveyed upon segment base bus 58 to adder circuit 76 under the control of segment selection control unit 74. The displacement/base sum is conveyed to reservation station storage and control unit 70 for storage, and is additionally stored in storage circuit 78 along with the reorder buffer tag identifying the corresponding instruction.

While adder circuit 76 is generating the displacement/base sum, operands/tags bus 52 conveys the register operand values or reorder buffer tags corresponding to the instruction. The values conveyed are stored in storage circuit 80 for conveyance during the following clock cycle. It is noted that a storage circuit similar to storage circuits 78 and 80 may be inserted between displacement bus 54 and adder circuit 76 if the displacement is provided by decode unit 20A toward the end of a clock cycle. Alternatively, the storage circuit may be included in decode unit 20A. As used herein, the term storage circuit refers to a circuit configured to capture a value according to the clock signal defining the clock cycle of microprocessor 10. The value is available at the output of the storage circuit until a new value is captured during the following clock cycle. Additionally, the term selection circuit refers to a circuit configured to select between at least two inputs based upon selection controls provided by a control unit. For example, one or more multiplexors coupled in parallel or cascade fashion may form a selection circuit.

It is noted that in the embodiment shown, register operands bus 90 conveys two register operands to address generation unit 21A. However, certain instructions may employ zero or one register operands for address generation. Reorder buffer 32 may provide zero values for register operands not employed by an instruction, such that these values may be added to the displacement/base sum in address generation unit 21A without affecting the address generated.

It is further noted that first reservation stations 23 store address generation information for instructions which include a memory operation. If an instruction does not perform a memory operation, no information is stored in first reservation stations 23. Furthermore, if no information is conveyed to an address generation unit 21A–21C during a clock cycle, an invalid reorder buffer tag is conveyed by the corresponding first reservation station 23. Since the reorder buffer tag is invalid, load/store unit 26 ignores the contents of the corresponding address bus 36.

Figure 4A:
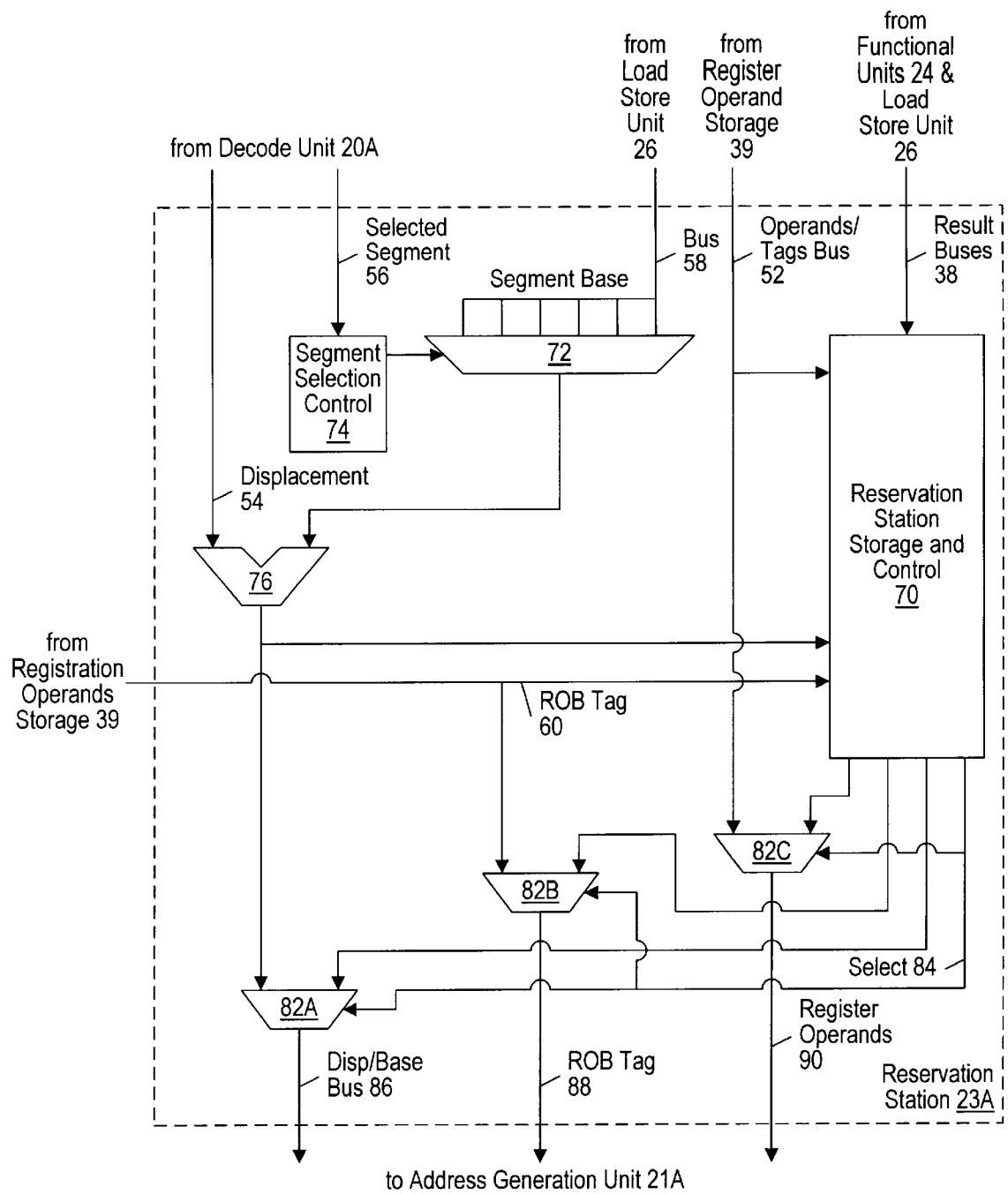
FIG. 4A is a logic diagram of a second embodiment of the first reservation station shown in FIG. 3.

Turning next to FIG. 4A, a logic diagram a second embodiment of first reservation station 23A. Like numbered elements to the elements included in FIG. 4 are similar to those elements. As shown in FIG. 4A, first reservation station 23A eliminates first and second storage circuits 78 and 80. Instead of storing the values in first and second storage circuits 78 and 80, storage circuits may be included upon displacement/tag bus 86, reorder buffer tag bus 88, and register operands bus 90. The storage circuits may be included within first reservation station 23A or within address generation unit 21A. It is further noted that values may be stored at various points within first reservation station 23A and address generation unit 21A according to various embodiments of microprocessor 10 without departing from the functionality described herein.

Figure 5:
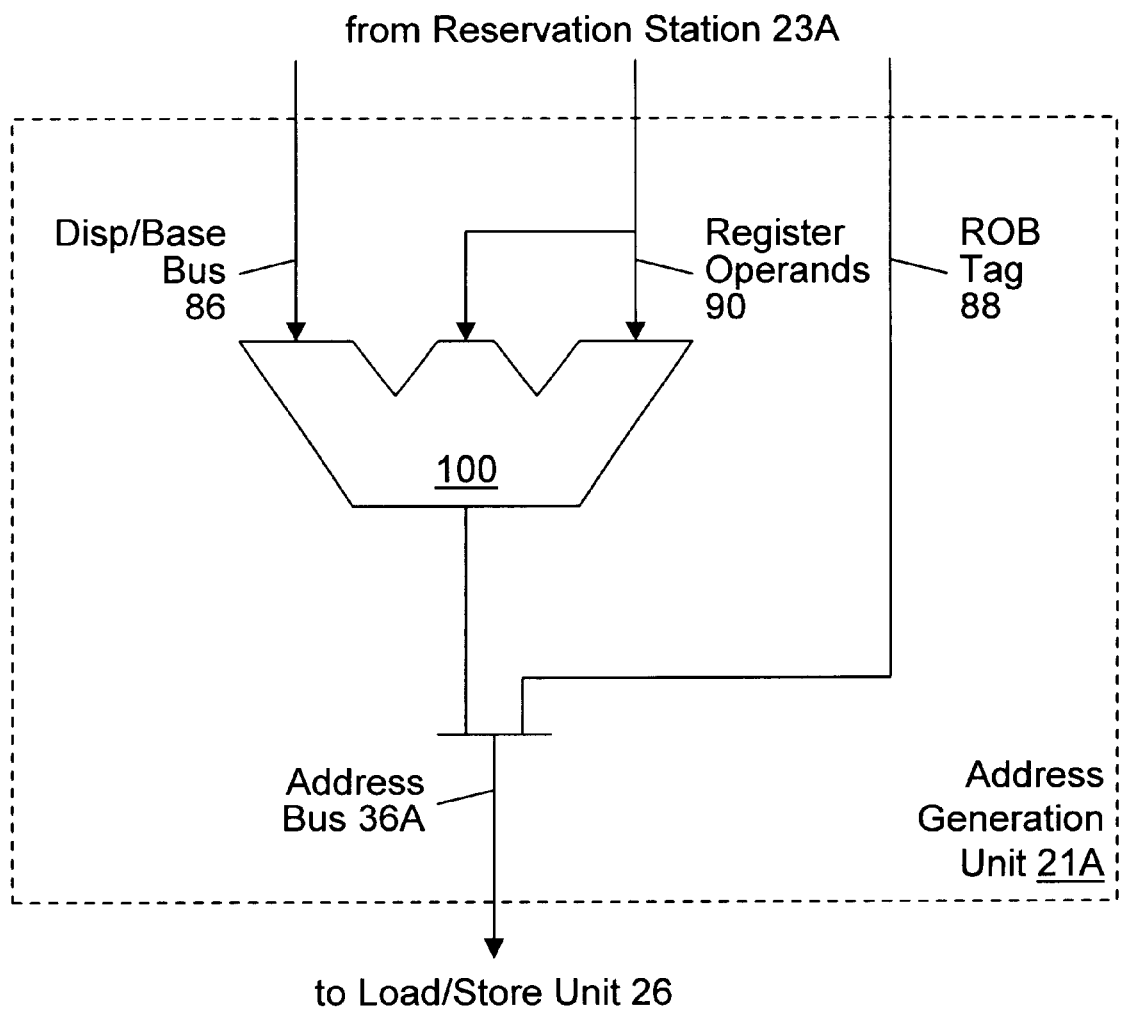
FIG. 5 is a logic diagram of one embodiment of the address generation unit shown in FIG. 3.

Turning next to FIG. 5, a logic diagram of one embodiment of address generation unit 21A is shown. Address generation unit 21A receives displacement/base bus 86, register operands bus 90, and second ROB tag bus 88 from first reservation station 23A. Displacement/base bus 86 and register operands bus 90 are coupled to an adder circuit 100. Second ROB tag bus 88 forms a portion of address bus 36A.

Adder circuit 100 adds the two register operands provided upon register operands bus 90 to the displacement/base sum provided upon displacement/base bus 86. The resulting sum, conveyed upon address bus 36A, comprises the linear address corresponding to the instruction identified by the reorder buffer tag conveyed upon second reorder buffer tag bus 88. It is noted that adder circuit 100 as shown in FIG. 5 is a three input adder circuit. Alternatively, a pair of two input adders may be cascaded to perform the addition represented by adder circuit 100. Any suitable circuitry for performing a three input addition may be employed. It is further noted that, by removing address generation responsibilities from functional units 24, three input adders are not required in functional units 24. Functional units 24 may instead employ two input adders for executing the fast path instructions of microprocessor 10.

Figure 6:
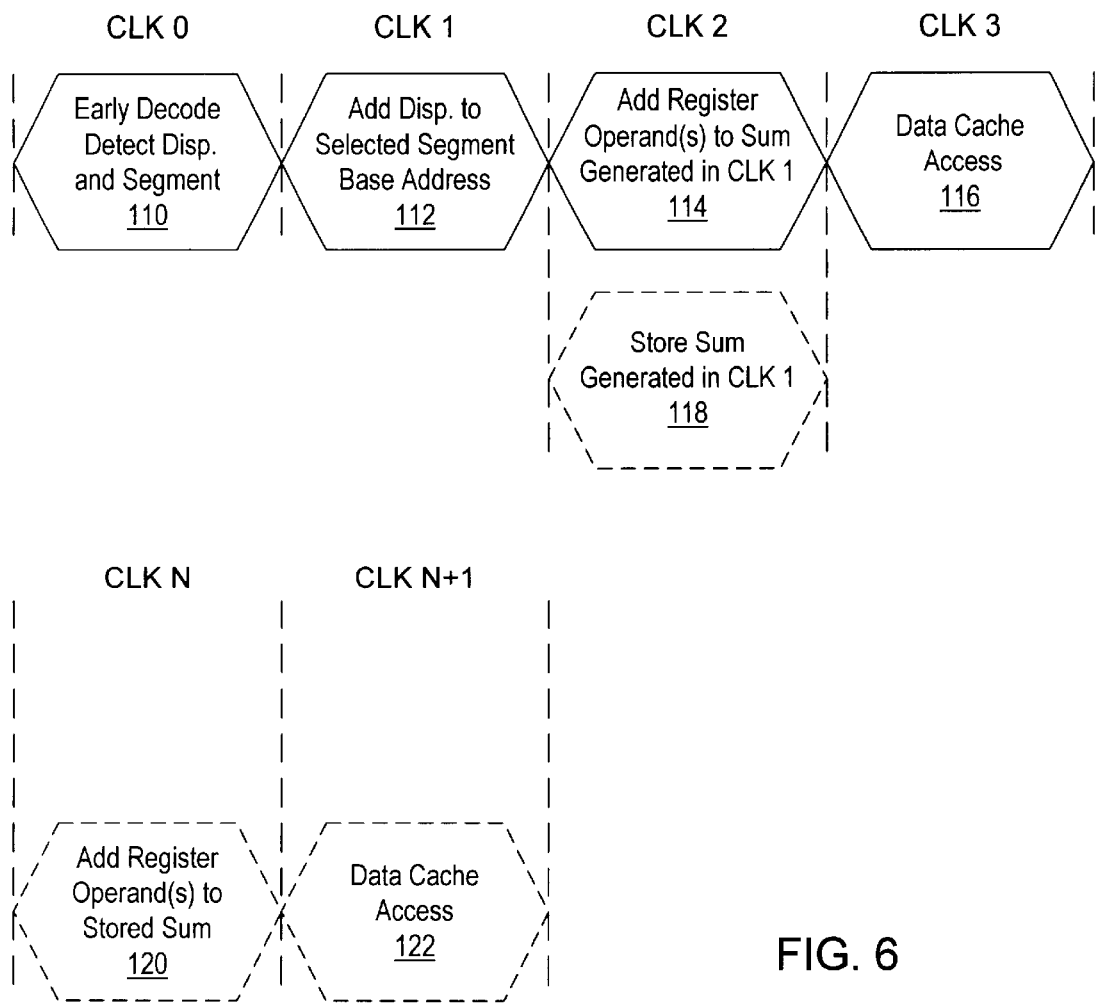
FIG. 6 is a timing diagram depicting events occurring within the units shown in FIG. 3 during an exemplary load memory operation.

Turning now to FIG. 6, a timing diagram is shown depicting events performed by the blocks shown in FIG. 3 for an exemplary load memory operation. Several clock cycles are shown, delimited by vertical dashed lines. Consecutive clock cycles CLK0, CLK1, CLK2, and CLK3 are shown, as well as consecutive clock cycles CLKN and CLKN+1. Clock cycle CLK3 may be non-consecutive to clock cycle CLKN.

During clock cycle CLK0, early decode unit 40A operates upon an instruction (block 110). If the instruction includes a load memory operation, early decode unit 40A detects the displacement corresponding to the instruction as well as the selected segment register. The displacement and selected segment are conveyed to first reservation station 23A. During clock cycle CLK1, first reservation station 23A adds the displacement to the segment base address corresponding to the selected segment register (block 112). Additionally, register operands are requested from register operand storage 39 during CLK1.

If the register operands used to form the data address are available, first reservation station 23A conveys the address generation information to address generation unit 21A. Address generation unit 21A adds the register operand or operands to the displacement/base sum generated during CLK2 (block 114). The linear address for the memory operand of the instruction is thereby successfully generated. During CLK3, data cache access may begin for the memory operand (block 116). It is noted that data cache access may occupy more than one clock cycle, according to certain embodiments of microprocessor 10.

Conversely, if one or more of the register operands used to form the data address are not available, the displacement/base sum is stored in reservation station storage and control unit 70 (block 118). Additionally, the reorder buffer tag of the instruction, register operands which are available, and reorder buffer tags for register operands which are not available are stored in reservation station storage and control unit 70. At a later clock cycle, the remaining register operands are provided on result buses 38. During CLKN (a clock cycle subsequent to CLK3), first reservation station 23A conveys the address generation information for the instruction to address generation unit 21A. Address generation unit 21A adds the sum previously stored by first reservation station 23A to the register operands (block 120). The resulting linear address is conveyed to load/store unit 26. During clock cycle CLKN+1 or a subsequent clock cycle, data cache access may be performed (block 122).

Figure 7:
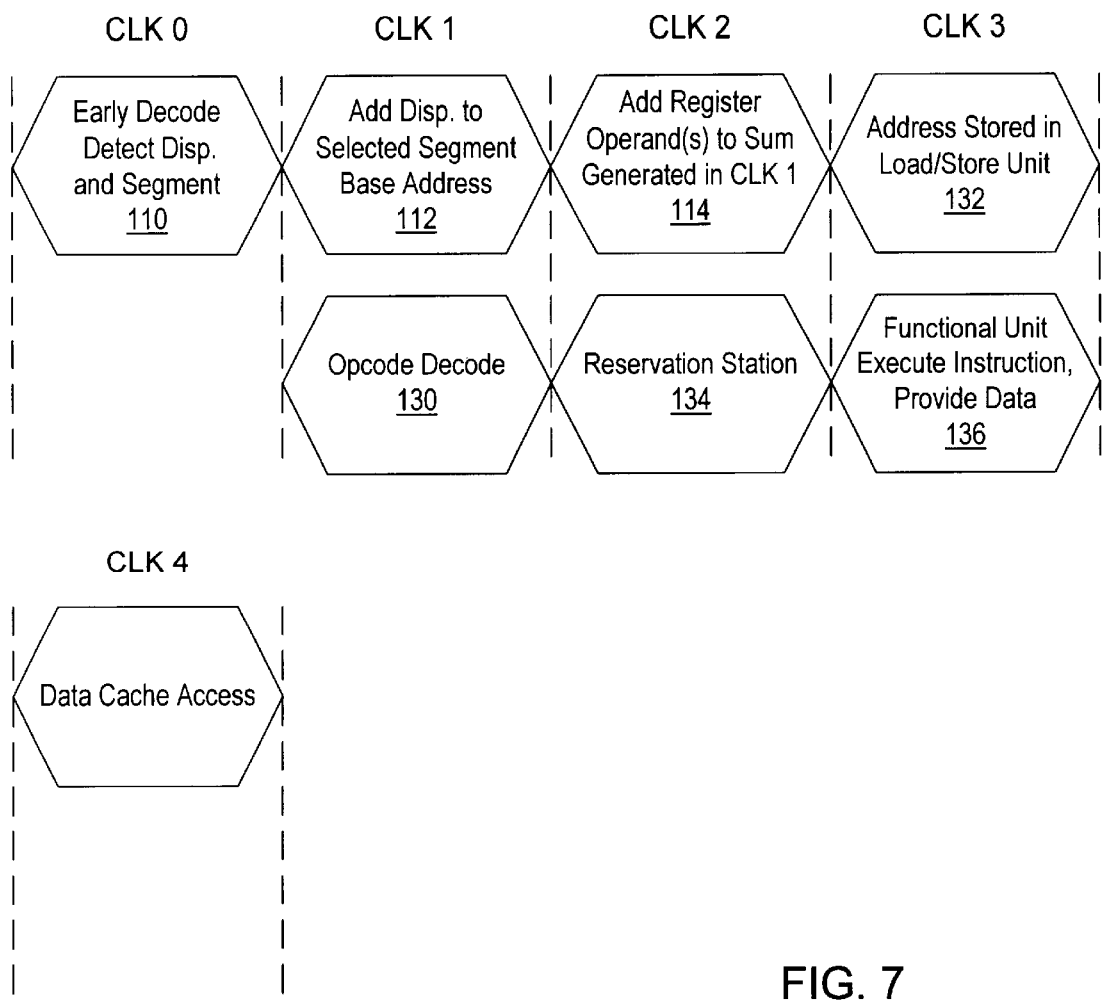
FIG. 7 is a timing diagram depicting events occuring within the units shown in FIG. 3 during an exemplary store memory operation.

Turning now to FIG. 7, a timing diagram of an exemplary store memory operation is shown. Several clock cycles are shown, delimited by vertical dashed lines. Consecutive clock cycles CLK0, CLK1, CLK2, CLK3, and CLK4 are shown.

During clock cycle CLK0, early decode unit 40A operates upon an instruction (block 110, similar to FIG. 6). If the instruction includes a store memory operation, early decode unit 40A detects the displacement corresponding to the instruction as well as the selected segment register. The displacement and selected segment are conveyed to first reservation station 23A. During clock cycle CLK1, first reservation station 23A adds the displacement to the segment base address corresponding to the selected segment register (block 112, similar to FIG. 6). Additionally, register operands are requested from register operand storage 39 during CLK1. The instruction passes to opcode decode unit 44A as well, and the opcode is decoded (block 130).

In the example shown, the register operands used to form the data address are available. Therefore, first reservation station 23A conveys the address generation information to address generation unit 21A. Address generation unit 21A adds the register operand or operands to the displacement/base sum generated during CLK1 (block 114, similar to FIG. 6). The linear address for the memory operand of the instruction is thereby successfully generated and conveyed to load/store unit 26. Load/store unit 26 stores the address provided until the store data is provided as well (illustrated by block 132 in CLK3). Additionally, the instruction arrives in second reservation station 22A (block 134). The register operands for the instruction are provided, and therefore the instruction is executed in functional unit 24A during CLK3 (block 136). The result of executing the instruction is forwarded from functional unit 24A to load/store unit 26.

During clock cycle CLK4, data cache access may begin (block 138). Data cache access may begin because both the store data address and store data have been provided. It is noted that, if functional unit 24A performed address generation as well as instruction execution, then data cache access would be delayed by at least one clock cycle. Block 114 would occur in clock cycle CLK3 in functional unit 24A. Load/store unit 26 would add the segment base address upon receipt of the logical address from functional unit 24A. During clock cycle CLK4, functional unit 24A would execute the instruction and provide data to load/store unit 26. Subsequently, data cache access may begin. By performing address generation and instruction execution in parallel, performance of instructions including store memory accesses may be advantageously increased.

Figure 8:
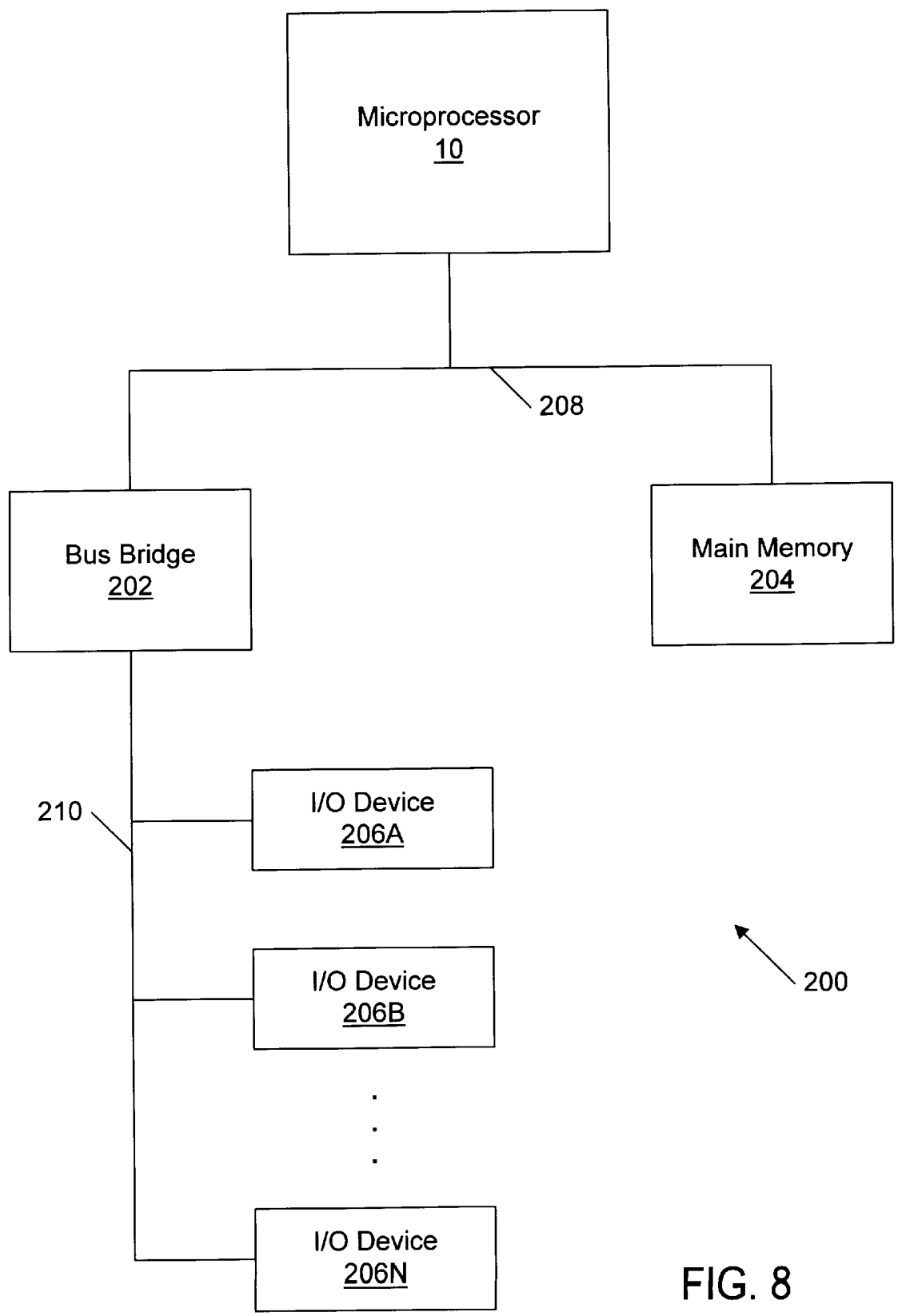
FIG. 8 is a block diagram of a computer system including the microprocessor shown in FIG. 1.

Turning now to FIG. 8, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 8 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

It is noted that the x86 microprocessor architecture, including its segmentation mechanism, have been used herein as a specific example. However, any microprocessor architecture employing a mechanism whereby a logical address formed from the operands of an instruction is added to a value generated by an address translation mechanism to produce a translated address may benefit from the present invention. Such embodiments are contemplated, and are intended to be within the spirit and scope of the present invention as defined in the appended claims.

It is noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1

| x86 Fast Path, Double Dispatch, and MROM Instructions | |
|---|---|
| x86 Instruction | Instruction Category |
| AAA | MROM |
| AAD | MROM |
| AAM | MROM |
| AAS | MROM |
| ADC | fast path |

TABLE 1-continued

| x86 Fast Path, Double Dispatch, and MROM Instructions | |
|---|---|
| x86 Instruction | Instruction Category |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |

TABLE 1-continued x86 Fast Path, Double Dispatch, and MROM Instructions

| x86 Instruction | Instruction Category |
| --- | --- |
| MOVCC | fast path |
| MOV CR | MROM |
| MOV DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | MROM |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered fast path instructions.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", Ser. No. 08/146,381, filed Oct. 29, 1993 by Witt; "Superscalar Microprocessor Including a High Performance Instruction Alignment Unit", Ser. No. 08/377,843, filed Jan. 25, 1995 by Witt, et al; "A Way Prediction Structure", Ser. No. 08/522,181, filed Aug. 31, 1995 by Roberts, et al; "A Data Cache Capable of Performing Store Accesses in a Single Clock Cycle", Ser. No. 08/521,627, filed Aug. 31, 1995 by Witt, et al; "A Parallel and Scalable Instruction Scanning Unit", Ser. No. 08/475,400, filed Jun. 7, 1995 by Narayan; and "An Apparatus and Method for Aligning Variable-Byte Length Instructions to a Plurality of Issue Positions", Ser. No. 08/582,473, filed Jan. 2, 1996 by Narayan, et al. The disclosure of these patent applications are incorporated herein by reference in their entirety.

In accordance with the above disclosure, a microprocessor having dedicated address generation units has been described. The microprocessor performs address generation within the address generation units, advantageously freeing functional units from the complexities of address generation. Additionally, the microprocessor combines linear and logical address generation by adding the displacement provided with the instruction to the segment base address identified by the instruction. The microprocessor may enjoy increased performance due to decreases in address generation latency. Decreases in address generation latency may be realized from starting the address generation at an earlier stage in the instruction processing pipeline. Furthermore, a reduction in the number of clock cycles used to perform address generation functions may reduce address generation latency.

Numerous variations and modifications will become apparent to those skilled in the art once the above disclosure is fully appreciated. It is intended that the following claims be interpreted to embrace all such variations and modifications.

What is claimed is:

1. A superscalar microprocessor comprising:
   a plurality of segment registers configured to store a plurality of segment base addresses;

a plurality of decode units configured to concurrently decode a plurality of instructions, wherein each of said plurality of decode units is configured to detect a displacement within a respective one of said plurality of instructions, and wherein said each of said plurality of decode units is configured to determine which one of said plurality of segment registers comprises a selected segment register identified by said respective one of said plurality of instructions;

a first plurality of reservation stations, wherein each one of said first plurality of reservation stations is coupled to a respective one of said plurality of decode units and to said plurality of segment registers, and wherein said first plurality of reservation stations are each configured to generate a first sum comprising said displacement and one of said plurality of segment base addresses, and wherein said one of said plurality of segment base addresses is stored in said selected segment register;

a plurality of address generation units, wherein each one of said plurality of address generation units is coupled to a respective one of said first plurality of reservation stations, and wherein said plurality of address generation units are each configured to generate a linear address comprising a second sum of said first sum and at least one register operand identified by said respective one of said plurality of instructions; and a load/store unit coupled to said plurality of address generation units, wherein said load/store unit is configured to perform a memory operation upon receipt of said linear address from said plurality of address generation units.

2. The superscalar microprocessor as recited in claim 1 further comprising a data cache coupled to said load/store unit, wherein said data cache is configured to store data, and wherein said load/store unit is configured to access said data cache during performance of said memory operation.

3. The superscalar microprocessor as recited in claim 2 further comprising a second plurality of reservation stations, wherein each one of said second plurality of reservation stations is coupled to a respective one of said plurality of decode units, and wherein said plurality of reservation stations are configured to store said plurality of instructions, and wherein each one of said plurality of instructions is stored in said second plurality of reservation stations until one or more operands of said one of said plurality of instructions are provided.

4. The superscalar microprocessor as recited in claim 3 further comprising a plurality of functional units, wherein each one of said plurality of functional units is coupled to a respective one of said second plurality of reservation stations, and wherein said each one of said plurality of functional units is configured to execute an instruction provided by said respective one of said second plurality of reservation stations.

5. The superscalar microprocessor as recited in claim 4 wherein said plurality of functional units are coupled to said load/store unit, and wherein a result of executing said instruction in one of said plurality of functional units is provided to said load/store unit, and wherein said load/store unit is configured to receive said result if a memory operation corresponding to said instruction is a store memory operation.

6. The superscalar microprocessor as recited in claim 5 wherein said first sum is generated by one of said first plurality of reservation stations during a first clock cycle, wherein said second sum is generated by one of said plurality of address generation units during a second clock cycle, and wherein said first clock cycle occurs before said second clock cycle.

7. A microprocessor comprising:

a plurality of segment registers configured to store a plurality of segment base addresses;

a reservation station including a first circuit coupled to said plurality of segment registers, wherein said first circuit is configured to generate a first sum comprising a displacement corresponding to an instruction and one of said plurality of segment base addresses, and wherein said one of said plurality of segment base addresses corresponds to one of said plurality of segment registers, wherein said one of said plurality of segment registers is selected in response to said instruction, and wherein said reservation station is configured to store said first sum until a register operand is provided;

a second circuit coupled to receive said first sum from said first circuit, wherein said second circuit is configured to generate a second sum by adding said first sum to said register operand identified by said instruction, and wherein said second sum comprises a linear address corresponding to an operand of said instruction; and wherein said reservation station is further configured to store at least two of said first sums corresponding to at least two of said instructions, wherein said reservation station is configured to select one of said at least two of said first sums for conveyance to said second circuit, wherein said reservation station comprises an adder circuit configured to produce said first sum, wherein said reservation station is configured to select said first sum from said adder circuit if said register operand corresponding to said instruction corresponding to said first sum from said adder circuit is provided, and if at least two register operands corresponding to said at least two instructions stored in said reservation station have not been provided.

8. A computer system comprising:

a microprocessor including:

a plurality of segment registers configured to store a plurality of segment base addresses;

a reservation station including a first circuit coupled to said plurality of segment registers, wherein said first circuit is configured to generate a first sum comprising a displacement corresponding to an instruction and one of said plurality of segment base addresses, and wherein said one of said plurality of segment base addresses corresponds to one of said plurality of segment registers, and wherein said one of said plurality of segment registers is selected in response to said instruction, and wherein said reservation station is configured to store said first sum until a register operand is provided; and a second circuit coupled to receive said first sum from said first circuit, wherein said second circuit is configured to generate a second sum by adding said first sum to said register operand identified by said instruction, and wherein said second sum comprises a linear address corresponding to an operand of said instruction; and an input/output (I/O) device coupled to said microprocessor and to another computer system, wherein said I/O device is configured to communicate between said microprocessor and said another computer system.

9. The computer system as recited in claim 8 wherein said I/O device comprises a modem.

10. A computer system comprising:

a microprocessor including:

a plurality of segment registers configured to store a plurality of segment base addresses;

a reservation station including a first circuit coupled to said plurality of segment registers, wherein said first circuit is configured to generate a first sum comprising a displacement corresponding to an instruction and one of said plurality of segment base addresses, and wherein said one of said plurality of segment base addresses corresponds to one of said plurality of segment registers, wherein said one of said plurality of segment registers is selected in response to said instruction, and wherein said reservation station is configured to store said first sum until a register operand is provided;

a second circuit coupled to receive said first sum from said first circuit, wherein said second circuit is configured to generate a second sum by adding said first sum to said register operand identified by said instruction, and wherein said second sum comprises a linear address corresponding to an operand of said instruction; and wherein said reservation station is further configured to store at least two of said first sums corresponding to at least two of said instructions, wherein said reservation station is configured to select one of said at least two of said first sums for conveyance to said second circuit, wherein said reservation station comprises an adder circuit configured to produce said first sum, wherein said reservation station is configured to select said first sum from said adder circuit if said register operand corresponding to said instruction corresponding to said first sum from said adder circuit is provided, and if at least two register operands corresponding to said at least two instructions stored in said reservation station have not been provided; and an input/output (I/O) device coupled to said microprocessor and to another computer system, wherein said I/O device is configured to communicate between said microprocessor and said another computer system.

11. The computer system as recited in claim 10 wherein said I/O device comprises a modem.

12. A microprocessor comprising:

a plurality of segment registers configured to store a plurality of segment base addresses;

a reservation station coupled to said plurality of segment registers, wherein said reservation station includes a first circuit;

a second circuit coupled to said reservation station;

wherein said first circuit is configured to generate a first sum comprising a displacement corresponding to an instruction and one of said plurality of segment base addresses corresponding to said instruction, wherein said one of said plurality of segment base addresses corresponds to one of said plurality of segment registers, wherein said reservation station is configured to store said first sum until a register operand is provided, wherein said reservation station is configured to provide said first sum to said second circuit, wherein said second circuit is configured to generate a second sum comprising said first sum and said register operand, and wherein said second sum comprises a linear address corresponding to an operand of said instruction.

13. The microprocessor as recited in claim 12, wherein said reservation station is further configured to store at least two of said first sums corresponding to at least two of said instructions.

14. The microprocessor as recited in claim 13, wherein said reservation station is configured to select one of said at least two of said first sums for conveyance to said second circuit.

15. The microprocessor as recited in claim 14, wherein said first circuit comprises an adder circuit configured to produce said first sum.

16. The microprocessor as recited in claim 12, wherein said reservation station includes at least two of said first circuits for generating at least two of said first sums concurrently in response to at least two of said instructions.

17. The microprocessor as recited in claim 16, further comprising:

at least two of said second circuits, wherein said at least two of said second circuits are configured to generate at least two of said second sums concurrently in response to said at least two of said instructions.

18. The microprocessor as recited in claim 12, wherein said linear address corresponds to a memory operation performed by said microprocessor in response to said instruction.

19. The microprocessor as recited in claim 18, further comprising:

a load/store unit coupled to said second circuit, wherein said load/store unit is configured to perform said memory operation.

20. The microprocessor as recited in claim 19, further comprising:

a decode unit coupled to said reservation station, wherein said decode unit is configured to decode said instruction into a decoded instruction, wherein said decode unit is configured to detect said displacement within said instruction, and wherein said decode unit is configured to determine that said one of said plurality of segment registers corresponds to said instruction.

21. The microprocessor as recited in claim 20, further comprising:

a functional unit coupled to said reservation station, wherein said functional unit is configured to receive said decoded instruction, and wherein said functional unit is configured to produce a result in response to said decoded instruction.

22. The microprocessor as recited in claim 21, wherein said functional unit is coupled to said load/store unit, wherein said functional unit is configured to provide said result to said load/store unit, and wherein said load/store unit is configured to receive said result if said memory operation is a store memory operation.

23. The microprocessor as recited in claim 12, wherein said first circuit generates said first sum during a first clock cycle, wherein said second circuit generates a second sum during a second clock cycle, and wherein said first clock cycle occurs before said second clock cycle.

* * * * *